United States Patent [19]

Pearce, Jr. et al.

[11] 4,289,924
[45] Sep. 15, 1981

[54] INJECTABLE GROMMET ASSEMBLY

[75] Inventors: Warren Pearce, Jr., Warren; Stephan H. Schramme, Cortland; John L. Lightner, Austintown; Joseph A. McGee, Warren, all of Ohio

[73] Assignee: General Motors Corporation, Detroit, Mich.

[21] Appl. No.: 190,446

[22] Filed: Sep. 24, 1980

[51] Int. Cl.³ .................... H02G 3/22; H01B 17/30
[52] U.S. Cl. ............................ 174/152 G; 174/156; 248/56
[58] Field of Search ............ 174/65 G, 152 R, 152 G, 174/153 G, 155, 156, 157; 16/2; 248/56; 277/178

[56] References Cited

U.S. PATENT DOCUMENTS 2,813,692  11/1957  Bremer et al. .................... 248/56

Primary Examiner—Laramie E. Askin
Attorney, Agent, or Firm—F. J. Fodale

[57] ABSTRACT

An injectable grommet assembly for passing a bundle of insulated electric wires through a bulkhead comprises a pair of assembled shells having complementary grommet and flange segments. The grommet segments form an annular seal chamber which surrounds the bundle of insulated electric wires. A wire clip disposed in this chamber spreads out the bundle of insulated wires so that sealant injected into the chamber also fills spaces between the insulated electric wires. The assembly also includes a gasket for sealing against the face of the bulkhead.

3 Claims, 7 Drawing Figures

INJECTABLE GROMMET ASSEMBLY

This invention relates to sealed installations for passing electrical wires through a bulkhead.

The passenger and engine compartments of an automobile are separated by a bulkhead. Several electrical wires must be passed through this bulkhead in order to connect controls and other electrical devices in the passenger compartment to electrical devices in the engine compartment. The wires are preferably passed through in a sealed installation to isolate the passenger compartment from the undesirable environment of the engine compartment.

In the past, several wires were bundled together and passed through a hole in the bulkhead which was then sealed by a rubber grommet. The rubber grommet was either premolded and assembled to the bundle or molded directly to the bundle before installation to the bulkhead. The sealing effectiveness of these methods diminishes as the number of wires in the bundle increases. Consequently, these methods are not suitable when the bundle has a large number of wires.

Another known method is to use an electrical connector at the bulkhead. Bulkhead connectors, however, increase in size as the number of wires in the bundle increases. Consequently, this method is often not suitable for a large number of wires because of space limitations.

It is also known from U.S. Pat. No. 2,813,692 granted to H. B. Bremer et al on Nov. 19, 1957 to provide a sealed bulkhead installation comprising several two-piece grommets which are assembled around each of several cables passing through the bulkhead. The grommets are then secured to the bulkhead and a cover plate assembly. Each grommet is then filled with a sealant compound. This installation is designed for aircraft or other similar applications which involve several electric wires which are combined in a relatively few large multi-wire cables. This method is not feasible in installations typically used in automobiles which involve a large bundle of small insulated electric wires, i.e., approximately 23 to 32 wires ranging in size from 6 to 30 gauge.

The object of this invention is to provide an injectable grommet assembly for a sealed bulkhead installation which will accommodate a large bundle of small electric wires passing through the bulkhead.

A feature of this invention is that it includes finger-like means to spread out the wires so that the sealant can penetrate between the wires in a large bundle of small insulated wires.

Another feature of the invention is that it can accommodate a large bundle of small electric wires of mixed gauge sizes.

Yet another feature of the invention is that it may be secured to a large bundle of small insulated electric wires and then simply secured to the bulkhead to provide a sealed installation.

Further objects and advantages of the present invention will be apparent from the following description, reference being had to the accompanying drawings wherein a preferred embodiment of the present invention is clearly shown.

Figure 1:
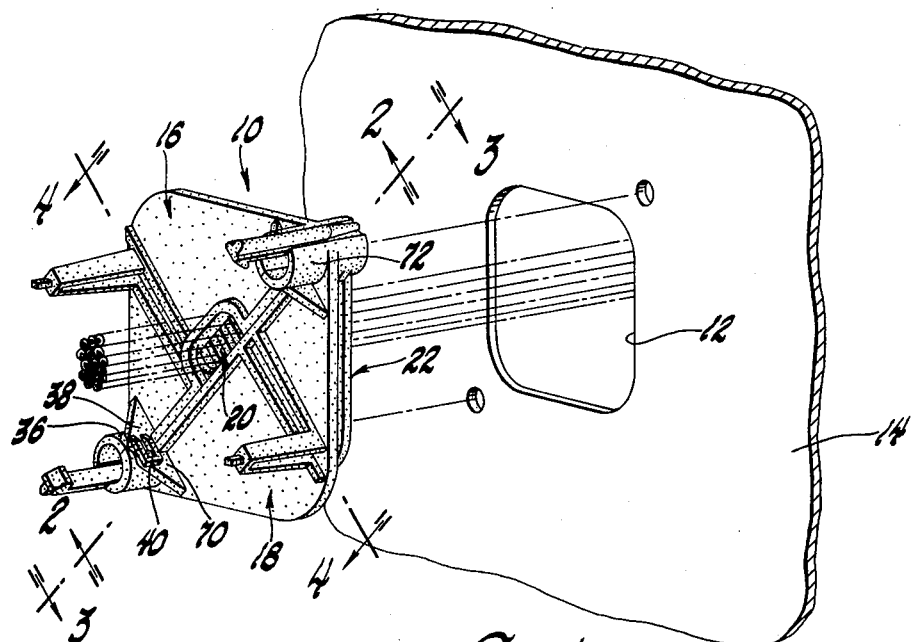
FIG. 1 is a perspective view of an injectable grommet assembly of this invention in the process of being installed on a bulkhead.

Referring now to the drawing and particularly to FIG. 1, there is shown an injectable grommet assembly 10 encircling a bundle of electric wires which are shown in phantom and passing through a hole 12 through a bulkhead 14. The grommet assembly 10, when injected with a suitable sealant and secured to the bulkhead 14, provides a sealed installation for the electric wires passing through the bulkhead 14.

The grommet assembly 10 comprises shells 16 and 18 which are latched together around the bundle of electric wires, a wire clip 20 which is inside a chamber formed by the two shells, and a gasket 22 which engages the face of the bulkhead 14.

Figure 2:
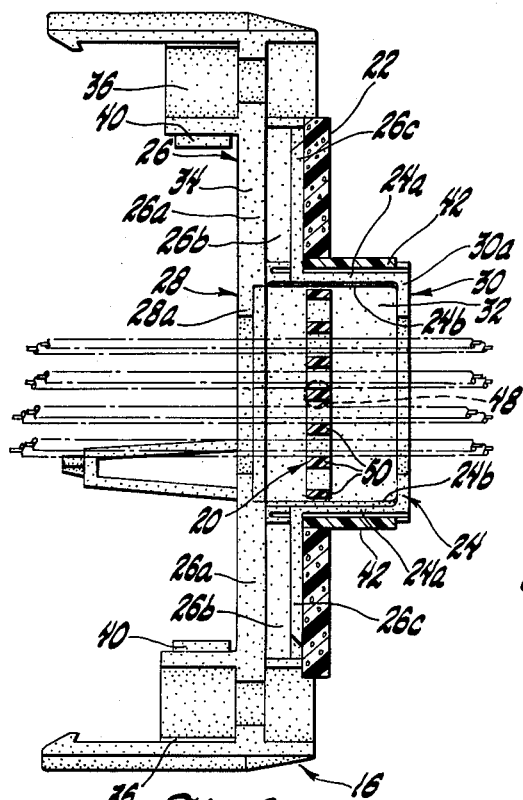
FIG. 2 is a section taken substantially along the line 2—2 of FIG. 1 looking in the direction of the arrows.
Figure 4:
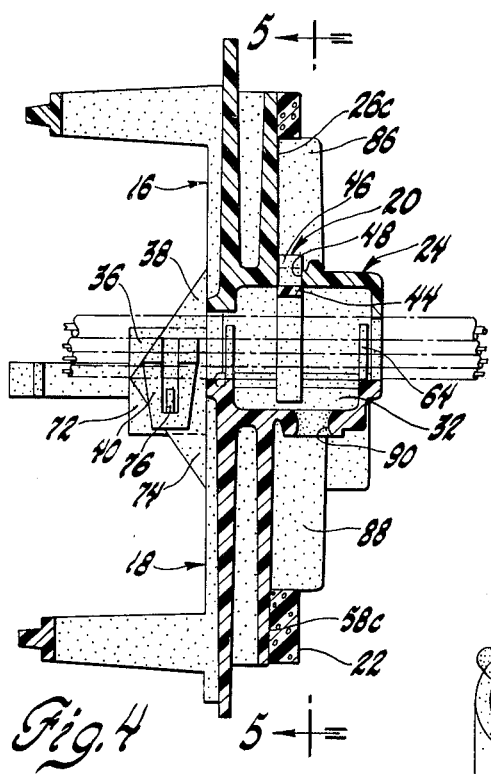
FIG. 4 is a section taken substantially along the line 4—4 of FIG. 1 looking in the direction of the arrows.
Figure 5:
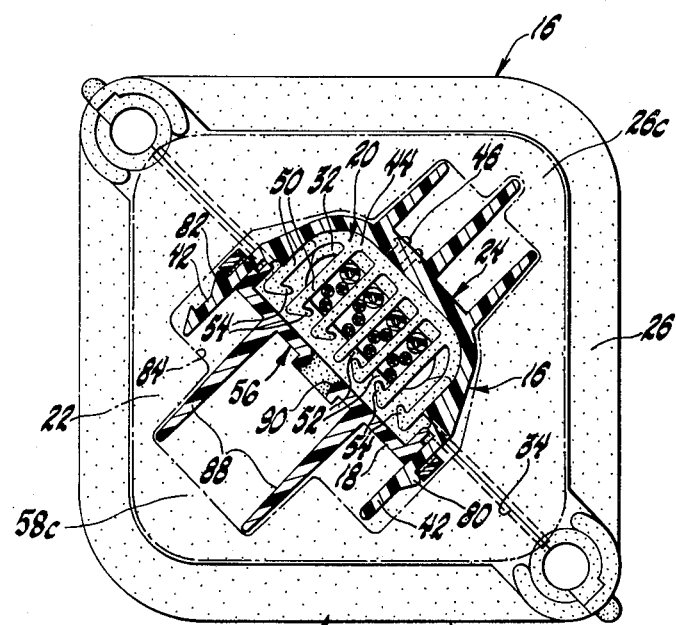
FIG. 5 is a section taken substantially along the line 5—5 of FIG. 4 looking in the direction of the arrows.

Referring now to FIGS. 2, 4 and 5, the shell 16 is molded from a hard plastic material such as nylon. The shell 16 comprises a deep oblong grommet segment 24 which has an integrally attached flange segment 26 at one end. The flange segment 26 is directed outwardly and is triangular in shape. The grommet segment 24 also has inward flanges 28 and 30 at its respective ends which provide an internal cavity 32.

The shell 16 has a planar mating face 34 which engages a complementary mating face of the shell 18. This mating face 34 comprises grommet faces 24a at the ends of the grommet segment 24, and flange faces 26a, 28a and 30a associated with each of the grommet faces 24a. The flange faces 26a of the flange segment 26 each have a radial groove 26b extending from the cavity 32 outward toward one of the opposite ends of the flange segment 26. The radial grooves 26b stop short of the respective ends of the flange segment 26 and open onto the end face 26c. The inner ends of the radial grooves 26b communicate with cavity 32 via longitudinal grooves 24b at the inner edges of the grommet faces 24a.

The two opposite ends of the flange segment 26 each have a partial boss 36 which is strengthened by a gusset 38. Each gusset 38 has a latch arm 40 which projects beyond the mating face 34 of the shell 16. The grommet segment 24 also has a latch arm 42 at each end which projects beyond the mating face 34.

The cavity 32 receives the wire clip 20 which is also molded from a hard plastic material. The wire clip 20 comprises a base 44 which is shaped to conform with the inner wall of the cavity 32. See FIG. 5. The base 44 has an integral bifurcated head 46 which snaps through a hole 48 through the wall of the grommet segment 24 to retain the wire clip 20 in the cavity 32. The wire clip 20 includes several stiffly flexible cantilevered fingers 50 which form a plurality of wire receiving channels 52. The fingers 50 have hooks 54 at their free ends which provide restricted entrances to the wire receiving channels 52. All of the hooks 54 face inwardly which eliminates the need for a hook on the middle finger.

Figure 3:
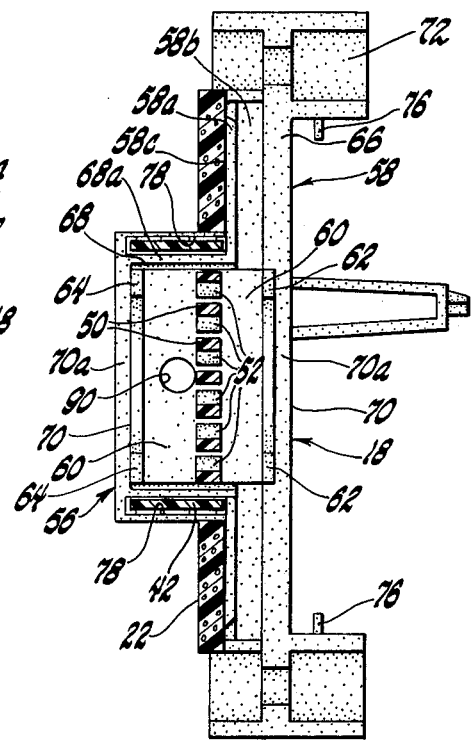
FIG. 3 is a section taken substantially along the line 3—3 of FIG. 1 looking in the direction of the arrows.

Referring now to FIGS. 3, 4 and 5, the shell 18 is also molded from a hard plastic material. It comprises a shallow oblong grommet segment 56 which has an integrally attached flange segment 58 at one end. The flange segment 58 extends outwardly and is triangular in shape. The grommet segments 24 and 56 form an annulus when the shells 16 and 18 are assembled. The flange segments 26 and 58 form a square mounting flange.

The grommet segment 56 includes a shallow cavity 60 which complements the cavity 32 to form an annular sealant chamber for surrounding the bundle of insulated electric wires. The grommet segment 56 also has a pair of inward lugs 62 and 64 at its respective ends. These lugs extend into the cavity 32 to insure proper mating of the shells 16 and 18.

The shell 18 has a planar mating face 66, FIG. 3, which complements the mating face 34 of the shell 16, FIG. 2. This mating face 66 comprises faces 68a of the grommet side walls 68, faces 70a of the grommet end walls 70 and flange faces 58a of the flange segment 58.

The flange faces 58a each have a radial groove 58b which extends from the cavity 60 outward toward one of the opposite ends of the flange segment 58. The radial grooves 58b stop short of the opposite ends of the flange segment 58 and open onto the end face 58c.

The opposite ends of the flange segment 58 have partial bosses 72 strengthened by gussets 74. The bosses 72 complement the partial bosses 36 of the shell 16 and have lock nibs 76 which cooperate with the latch arms 40 as shown in FIG. 4.

The inside edges of the side walls 68 are grooved and the grommet segment 56 also has longitudinal slots 78 along the side walls 68 which receive the lock arms 42 when the shells 16 and 18 are assembled together. Each of the lock arms 42 has a pair of nibs 80 and 82 as shown in FIG. 5.

The gasket 22 is square-shaped and lies against the end faces 26c and 58c of the flange segments 26 and 58 as shown in phantom in FIG. 5. The gasket 22 has an irregular cutout 84 which accommodates the grommet segments 24 and 56 and integral stringers 86 and 88 which rigidify the grommet segments 24 and 56 with respect to the respective flange segments 26 and 58.

The injectable grommet assembly 10 is assembled in the following manner. The wire clip 20 is inserted into the cavity 32 of the shell 16 and retained therein by the bifurcated head 46. The several insulated electric wires of the bundle are then spread apart and inserted into the channels 52 where they are temporarily retained by the hooks 54. The shell 18 is then assembled to the shell 16 in two stages. The outer ends of the latch arms 42 are first inserted into the longitudinal slots 78 and the shells 16 and 18 are moved toward each other until the end nibs 80 pass through the slots 78 and the edges of the slots 78 rest on the nibs 82. The nibs 80 retain the shells 16 and 18 in this partially assembled position while the nibs 82 act as stops to prevent full assembly. In this partially assembled position, the tips of the lugs 62 and 64 project into the cavity 32 to assure correct alignment of the shells. Once correct alignment is assured, the parts are completely assembled by snapping the nibs 82 through the slots 78 and the latch arms 40 over the nibs 76.

Figure 6:
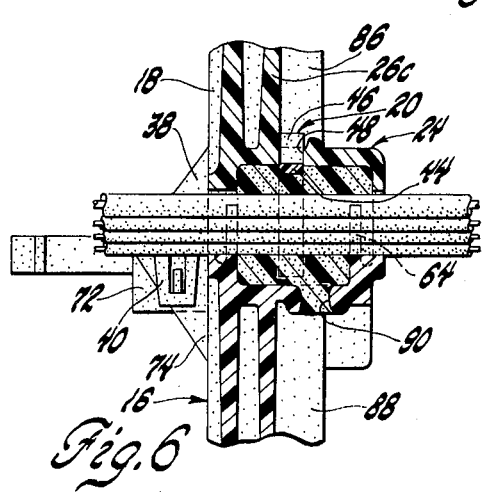
FIG. 6 is a view similar to FIG. 4 showing the injectable grommet assembly after it has been injected with a sealant material.
Figure 7:
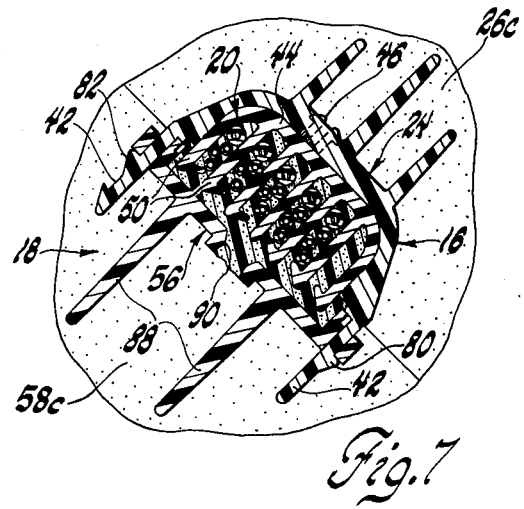
FIG. 7 is a view similar to FIG. 5 showing the injectable grommet assembly after it has been injected with a sealant material.

The annular sealant chamber formed by the cavities 32 and 60 is then filled with a fluid sealant through a fill hole 90 which extends through a wall of the grommet segment 56. This sealant completely fills the chamber and the spaces between the insulated electric wires as shown in FIGS. 6 and 7.

The sealant also fills the mating grooves 26b and 58b to provide a seal at the interface of the shells 16 and 18. Sealant exiting the grooves 26b and 58b at their respective openings onto the end faces 26c and 58c insures that the grooves are filled. When cured, the sealant provides a sealed assembly which is firmly attached to the bundle of insulated electric wires.

By way of example, a nylon based polyamide hot melt sealant could be utilized. Other possibilities are foam silicone or urethane materials.

The gasket 22 is then mounted on the mounting flange comprising the complementary flange segments 26 and 58. A sealed installation is then provided simply by securing the mounting flange to the bulkhead by bolts or the like in the bosses 36,72.

We wish it to be understood that we do not desire to be limited to the exact details of construction shown and described, for obvious modifications will occur to a person skilled in the art.

The embodiments of the invention in which an exclusive property or privilege is claimed are defined as follows:

1. An injectable grommet assembly for passing a bundle of insulated electric wires through a bulkhead comprising
 a first shell including a grommet segment having an integral outward flange segment at one end and an inward flange at each end defining an internal cavity,
 finger-like means in the cavity for spreading out a bundle of insulated electric wires so that sealant can penetrate between the insulated wires,
 a second shell secured to the first shell, said second shell including a grommet segment which cooperates with the grommet segment of the first shell to form an annular sealant chamber for surrounding the bundle of insulated electric wires,
 said last mentioned grommet segment having an integral outward flange segment at one end which complements the flange segment of the first shell to provide a mounting flange, and
 said flange segments having complementary grooves communicating with the annular sealant chamber.

2. An injectable grommet assembly for passing a bundle of insulated electric wires through a bulkhead comprising
 a first shell including an oblong grommet segment having an integral outward flange segment at one end and an inward flange at each end defining an internal cavity,
 a wire clip disposed in the cavity, said wire clip having a plurality of cantilevered fingers for spreading out a bundle of insulated electric wires so that sealant can penetrate between the insulated wires,
 a second shell secured to the first shell, said second shell including an oblong grommet segment which cooperates with the grommet segment of the first shell to form an annular sealant chamber for surrounding the bundle of insulated electric wires,
 said grommet segment of the second shell having an integral outward flange segment at one end which complements the flange segment of the first shell to provide a mounting flange,
 said flange segments having complementary grooves communicating with the annular sealant chamber for sealing the interface of said shells, and a gasket surrounding the grommet segments and engaging a face of the mounting flange.

3. An injectable grommet assembly for passing a bundle of insulated electric wires through a bulkhead comprising
- a first shell including a deep oblong grommet segment having an integral outward flange segment at one end and an inward flange at each end defining an internal cavity,
- a wire clip secured in the cavity for spreading out a bundle of insulated electric wires so that sealant can penetrate between the insulated wires, said wire clip having a plurality of stiffly flexible fingers forming wires receiving channels, which have openings restricted by hooks on the ends of said fingers,
- a second shell including a shallow oblong grommet segment which cooperates with the grommet segment of the first shell to form an annular sealant chamber for surrounding the bundle of insulated electric wires when the shells are secured together,
- means for securing the shells together including cooperating latch means on said grommet segments for securing said shells together in a staged assembly,
- said shallow oblong grommet segment having an integral outward flange segment at one end which complements the flange segment of the first shell to provide a polygonal mounting flange around the grommet segments,
- said flange segments having complementary grooves communicating with the annular sealant chamber for sealing the interface of said shells, a gasket surrounding the grommet segments and engaging a face of the mounting flange and means on the mounting flange for securing the assembly to a bulkhead.

* * * * *